(12) United States Patent
Kim

(10) Patent No.: US 11,151,800 B1
(45) Date of Patent: Oct. 19, 2021

(54) METHOD AND APPARATUS FOR ERASING REAL OBJECT IN AUGMENTED REALITY

(71) Applicant: ELECTRONICS AND TELECOMMUNICATIONS RESEARCH INSTITUTE, Daejeon (KR)

(72) Inventor: Yong Sun Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/210,991

(22) Filed: Mar. 24, 2021

(30) Foreign Application Priority Data

Mar. 25, 2020 (KR) .................... 10-2020-0036142

(51) Int. Cl.
| | | |
|---|---|---|
| *G06T 19/00* | (2011.01) | |
| *G06T 19/20* | (2011.01) | |
| *G06N 3/04* | (2006.01) | |
| *G06T 5/00* | (2006.01) | |
| *G06T 3/40* | (2006.01) | |

(52) U.S. Cl.
CPC .......... *G06T 19/006* (2013.01); *G06N 3/0454* (2013.01); *G06T 3/4007* (2013.01); *G06T 5/005* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 6,172,687 B1 * | 1/2001 | Kitamura | ............ G06F 12/0207 345/564 |
| 10,417,829 B2 | 9/2019 | Kim et al. | |
| 2017/0200313 A1 | 7/2017 | Lee et al. | |

FOREIGN PATENT DOCUMENTS

| | | |
|---|---|---|
| KR | 10-1159203 | 6/2012 |
| KR | 10-1466815 | 12/2014 |

OTHER PUBLICATIONS

Bescos et al., DynaSLAM: Tracking, Mapping, and Inpainting in Dynamic Scenes, Jul. 26, 2018, 4076-4083 (Year: 2018).*
Mori et al, 3D PixMix: Image Inpainting in 3D Environments, Oct. 20, 2018, 1-2 (Year: 2018).*

(Continued)

*Primary Examiner* — Robert J Craddock
(74) *Attorney, Agent, or Firm* — Kile Park Reed & Houtteman PLLC

(57) ABSTRACT

A method and apparatus for erasing real object in augmented reality can be disclosed. The apparatus can receive an erasing area in the 3D augmented reality from a user, generate a 2D mask and a 3D mask corresponding to the erasing area, and generate a hole in the 3D augmented reality by using the 2D mask and the 3D mask. The apparatus can synthesize a first texture image for an hole area corresponding the hole by using a second texture image corresponding to an area excluding the 2D mask, calculate a first vertex value for the hole area by using a second vertex value corresponding to an area excluding the 3D mask, and perform inpainting on the hole are by using the first texture image and the first vertex value.

16 Claims, 8 Drawing Sheets

(56) References Cited

OTHER PUBLICATIONS

Jan Herling et al, "High-Quality Real-Time Video Inpainting with PixMix", IEEE Transactions on Visualization and Computer Graphics, Jun. 2014, pp. 866-879, vol. 20, No. 6.

Glen Queguiner et al, "Towards Mobile Diminished Reality", IEEE International Symposium on Mixed and Augmented Reality Adjunct (ISMAR-Adjunct), 2018, pp. 226-231.

* cited by examiner

METHOD AND APPARATUS FOR ERASING REAL OBJECT IN AUGMENTED REALITY

CROSS-REFERENCE TO RELATED APPLICATION

This application claims priority to and the benefit of Korean Patent Application No. 10-2020-0036142 filed in the Korean Intellectual Property Office on Mar. 25, 2020, the entire contents of which are incorporated herein by reference.

BACKGROUND OF THE INVENTION

(a) Field of the Invention

The present invention relates to a method and apparatus for erasing a real object in augmented reality.

(b) Description of the Related Art

Existing augmented reality provides additional information by adding a virtual object to an image of a real environment or provides an interaction between a virtual object and a user. In 2D augmented reality, a virtual image or a rendered image of a virtual object is added to a camera image. At this time, information on the real environment in the image is not utilized, and a virtual image is simply added to the real environment, so that the occlusion between the real object and the virtual object is not reflected, and there is a sense of heterogeneity in the sense of space, etc. Meanwhile, in 3D augmented reality, a virtual object is rendered in a 3D space to represent a phenomenon of being obscured between a real object and a virtual object, so it is possible to reduce a sense of heterogeneity between the real object and the virtual object. However, even in the existing 3D augmented reality, only the interaction between a virtual object and a user is possible in a fixed environment for a real object.

As an example, in furniture arrangement content using augmented reality, the actual environment is an empty space, and furniture is arranged in this empty space. The user can change the position of the virtual furniture and rotate it, but only the interaction between the user and the virtual furniture is possible. Since the real space is empty, no interaction between the user and the real space is performed. Recently, mobile apps and the like provide for arranging furniture in an actual living room rather than an empty space. Even in this case, it is at the level of rendering and adding virtual furniture to an actual image. Movement (rotation, etc.) for virtual furniture is possible, but there is no interaction with real furniture. Accordingly, it is impossible to provide various experiences such as replacing new furniture or changing the arrangement of furniture.

In this way, the existing augmented reality shows a virtual object added to the real environment, and only the interaction between the virtual object and the user is performed. In new augmented reality, interaction between a real object and a virtual object is required. Users also need to interact with both real objects and virtual objects, such as removing, moving, and manipulating real objects in augmented reality.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention can provide a method and apparatus for erasing real object in augmented reality According to an embodiment, a method for erasing a real object by an apparatus for erasing the real object in 3D augmented reality may be provided. The method may include receiving an erasing area in the 3D augmented reality from a user, generating a 2D mask and a 3D mask corresponding to the erasing area, generating a hole in the 3D augmented reality by using the 2D mask and the 3D mask, and performing inpainting on a hole area corresponding to the hole, wherein the performing includes synthesizing a first texture image for the hole area by using a second texture image corresponding to an area excluding the 2D mask and calculating a first vertex value for the hole area by using a second vertex value corresponding to an area excluding the 3D mask.

The method may further include performing rendering by using the first texture image and the first vertex value.

The first texture image and the second texture image may be 2D texture images.

The first vertex value and the second vertex value may be vertex coordinate values.

The synthesizing may include synthesizing the first texture image by applying a deep learning network to the second texture image.

The calculating may include calculating the first vertex value by interpolating using the second vertex value.

The interpolating may apply a moving least squares method.

The method may include adding a virtual object to the 3D augmented reality including the inpainted hole area.

The 3D augmented reality may be an image in which a real environment is restored to 3D.

According to another embodiment, an apparatus for erasing a real object in 3D augmented reality may be provided. The apparatus may include an environment reconstruction thread unit configured to perform 3D reconstruction of a real environment for the 3D augmented reality, an erase area selection unit configured to receive an erasing area in the 3D reconstruction image from a user, a hole area mask generation unit configured to generate a 2D mask and a 3D mask corresponding to the erasing area and to generate a hole in the 3D reconstruction image by using the 2D mask and the 3D mask, and a hole area synthesis unit configured to perform synthesis for an hole area corresponding to the hole by using a first texture image corresponding to an area excluding the 2D mask and a first vertex value corresponding to an area excluding the 3D mask.

The hole area synthesis unit may synthesize a second texture image for the hole area by using the first texture image, calculates a second vertex value for the hole area by using the first vertex value, and performs the synthesis by using the second texture image and the second vertex value.

The apparatus may further include a synthesis area rendering unit configured to perform rendering by using the second texture image and the second vertex value.

The hole area synthesis unit may include a generator configured to receive the first texture image and to output the second texture image, and a discriminator configured to determine an output of the generator.

The hole area synthesis unit may include a first generator configured to receive the first texture image, a first discriminator configured to determine an output of the first generator, a second generator configured to receive an output of the first generator and the first texture image and to output the second texture image, and a second discriminator configured to determine an output of the second generator.

The hole area synthesis unit may calculate the second vertex value by applying a moving least squares method using the first vertex value.

The apparatus may further include a virtual object adding unit configured to add a virtual object to an output image of the synthesis area rendering unit.

According to an embodiment, by deleting a real object when experiencing augmented reality, it is possible to provide an interaction between a user and a real object.

In addition, according to an embodiment, by placing a virtual object after deleting the real object, the virtual object can be placed as if there is no real object, thereby providing an interaction between the user, the virtual object, and the real object.

DETAILED DESCRIPTION OF THE EMBODIMENTS

Figure 1:
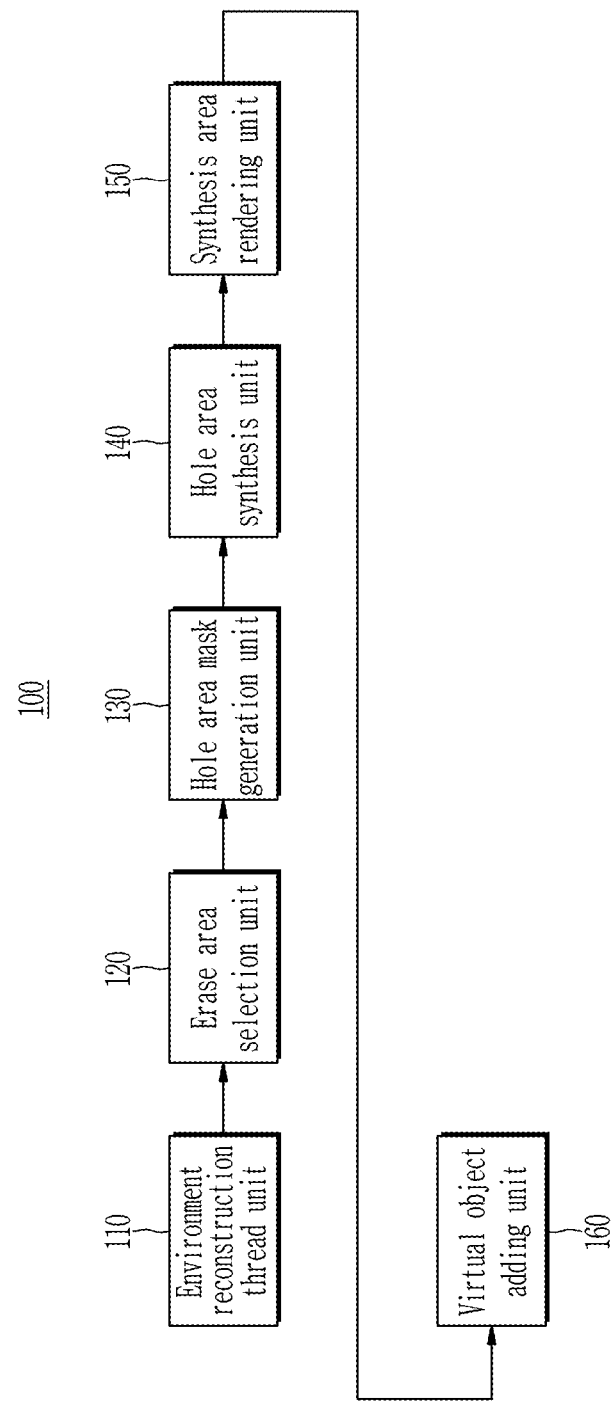
FIG. 1 is a block diagram showing a real object erasing apparatus, according to an embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" or "include", and variations such as "comprises", "comprising", "includes", or "including", will be understood to imply the inclusion of stated elements but not the exclusion of any other elements.

Hereinafter, a method and apparatus for erasing a real object in augmented reality according to an embodiment will be described in detail. Hereinafter, the term "apparatus for erasing a real object in augmented reality" is used interchangeably with the term "real object erasing apparatus", and the term "method for erasing a real object in augmented reality" is used interchangeably with the term "real object erasing method".

In order to virtually erase a real object, the method for erasing a real object according to an embodiment is based on a 3D augmented reality and synthesizes an area corresponding to the real object to be erased by using background information. In a situation where 6DOF (6 Degrees of Freedom) tracking of a camera and 3D reconstruction of a real environment are being performed in real time, the method for erasing a real object according to an embodiment includes receiving an area including the real object to be erased from a user. The area is erased from a mesh and texture, which are the 3D information of the real object. In addition, the method for erasing an actual object according to an embodiment uses a mesh and a texture for an area other than the erasing area (for example, a background surrounding the erased area) to synthesize (or inpaint) the erasing area. In the method for erasing a real object according to an embodiment, the synthesized 3D mesh and texture are rendered and added to the real camera image, thereby achieving an effect in which the real object is virtually erased.

FIG. 1 is a block diagram showing a real object erasing apparatus 100, according to an embodiment.

As shown in FIG. 1, the real object erasing apparatus 100 according to an embodiment includes an environment reconstruction thread unit 110, an erase area selection unit 120, a hole area mask generation unit 130, and a hole area synthesis unit 140, a synthesis area rendering unit 150, and a virtual object adding unit 160.

The environment reconstruction thread unit 110 performs three-dimensional reconstruction of a real environment. A method of implementing the three-dimensional reconstruction, that is, three-dimensional augmented reality corresponding to the real environment by the environment reconstruction thread unit 110, can be known to those of ordinary skill in the art, and a detailed description thereof will be omitted. Here, for 3D augmented reality, 6DOF (6 Degrees of Freedom) tracking for estimating camera posture in real time may also be performed. This 6DOF tracking is performed by a camera tracking thread unit (not shown in FIG. 1), and the camera tracking thread unit performs 6DOF tracking through multi-threading.

The erase area selection unit 120 receives an erasing area from a user. Here, the erasing area is an area corresponding to an object in 3D augmented reality, and the erasing area is selected by the user. That is, the user selects an area to be erased in 3D augmented reality.

The hole area mask generator 130 defines the erasing area input from a user as a hole area and generates a mask corresponding to the hole area. That is, the hole area mask generation unit 130 generates a mask corresponding to the area to be erased, and generates a hole in 3D augmented reality by using the generated mask. Here, the mask includes a 3D mask corresponding to a vertex coordinate system of a mesh and a 2D mask corresponding to an image coordinate system of a texture.

The hole area synthesis unit 140 performs inpainting on the hole area. That is, the hole area synthesis unit 140 synthesizes information on the hole area using information other than the hole area. Here, the inpainting to the hole area is largely performed through two steps. As a first step, the hole area synthesis unit 140 synthesizes (inpaints) pixel values for the hole area by using pixel values (RGB values) located other than the 2D mask generated by the hole area mask generation unit 130. That is, the hole area synthesis 140 synthesizes (inpaints) the pixel values of the hole area-by using pixel values of the 2D texture image corresponding to regions other than the 2D mask. The method of inpainting the 2D texture image will be described in more detail with reference to the following FIGS. 5 and 6. And as a second step, the hole area synthesis unit 140 calculates a vertex coordinate value for the hole area by using vertices other than the 3D mask generated by the hole area mask generating unit 130. That is, the hole area synthesis unit 140 calculates a vertex value of a 3D mesh corresponding to the hole area by interpolating through the vertex values of the 3D mesh other than the hole region. In other words, with respect to the hole area, the hole area synthesis unit 140 synthesizes pixel values of the 2D texture image and calculates vertex values of the 3D mesh through approximation.

The synthesis area rendering unit 150 performs rendering by using a mesh (vertex value of a 3D mesh) and a texture (2D texture image) corresponding to the synthesis region (area) synthesized by the hole area synthesis unit 140 and adds the synthesis region to the original image. As described above, the image added by the synthesis region can achieve an effect in which the region selected by the user (i.e., the real object) is removed.

Meanwhile, the virtual object adding unit 160 performs augmented reality by adding a virtual object to the 3D reconstructed image of the real environment from which the area selected by the user has been removed. Here, the 3D reconstructed image of the real environment is an image generated by synthesis area rendering unit 150.

Figure 2:
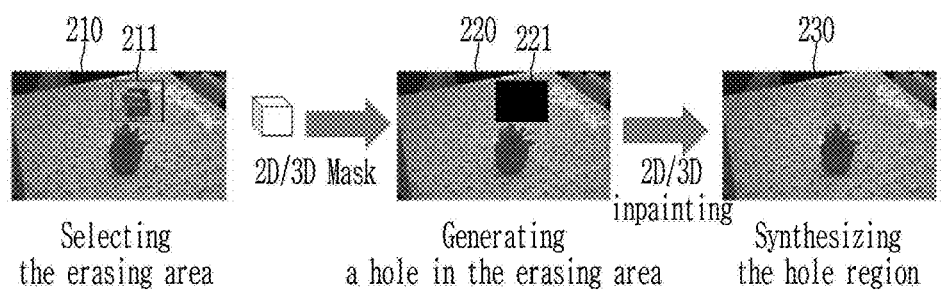
FIG. 2 shows a conceptual diagram of a schematic operation of the real object erasing apparatus, according to an embodiment.

FIG. 2 shows a conceptual diagram of a schematic operation of the real object erasing apparatus 100, according to an embodiment.

Referring to 210, the erasing area selection unit 120 receives an erasing area 211 in 3D augmented reality from a user. The hole area mask generation unit 130 generates a 2D mask and a 3D mask corresponding to the erasing area 211. And referring to 220, the hole area mask generator 130 generates a hole 221 in the erasing area. Referring to 230, the hole area synthesis unit 140 synthesizes the hole region (area) by performing 2D inpainting and 3D inpainting on the hole region.

Figure 3:
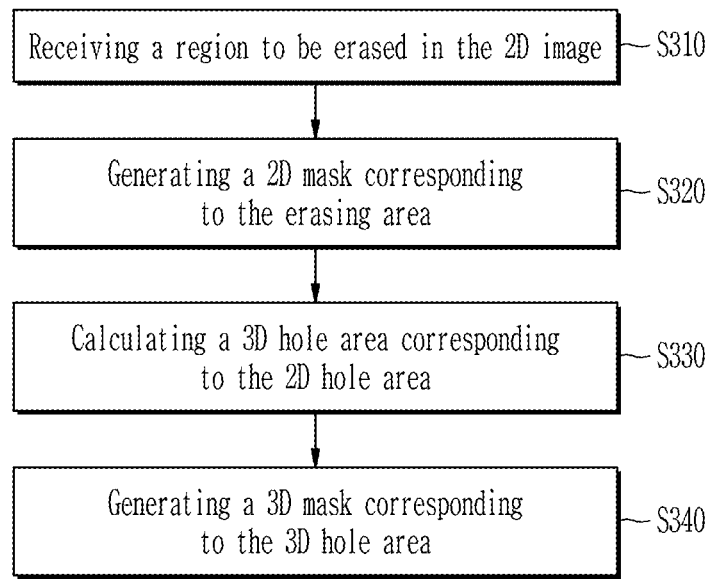
FIG. 3 is a flowchart showing a method of generating a mask, according to an embodiment.

FIG. 3 is a flowchart showing a method of generating a mask, according to an embodiment.

The erase area selection unit 120 receives a region to be erased in the 2D image from the user (S310).

The hole area mask generation unit 130 generates a 2D mask corresponding to the erasing area selected in step S310 (S320). Here, the hole area mask generation unit 130 can classify the hole area by allocating an area to be erased as 0 and an area not to be erased as 1 in the entire 2D image. The area allocated as 0 in the entire 2D image is the 2D hole area.

The hole area mask generation unit 130 calculates a 3D hole area corresponding to the 2D hole area generated in step S220 (S330), and generates a 3D mask corresponding to the 3D hole area (S340). Here, the following method may be used to calculate the 3D hole area corresponding to the 2D hole area. The 3D coordinate values of the mesh vertices are projected into the 2D image coordinate system (2D pixel grid). The 3D hole area corresponding to the 2D hole area is calculated from the projected 2D pixel grid.

Figure 4:
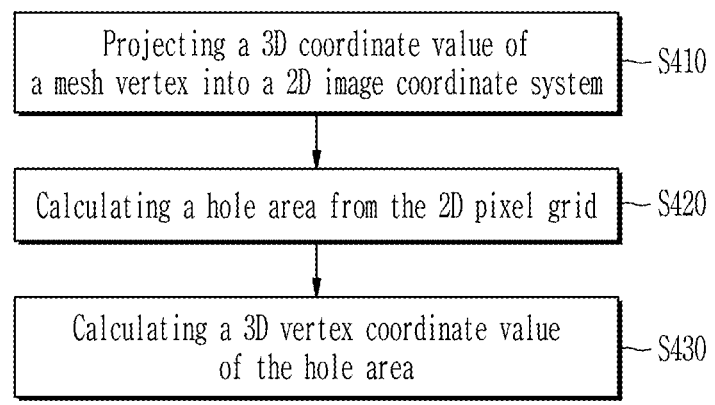
FIG. 4 is a flowchart showing an inpainting method for a 3D mesh, according to an embodiment.

FIG. 4 is a flowchart showing an inpainting method for a 3D mesh, according to an embodiment. That is, FIG. 4 shows a method of calculating a vertex coordinate value for a hole area (region) by the hole area synthesis unit 140, according to an embodiment.

First, the hole area synthesis unit 140 projects a 3D coordinate value of a mesh vertex into a 2D image coordinate system (2D pixel grid) (S410).

The hole area synthesis unit 140 calculates a hole area corresponding to the 2D mask obtained in FIG. 3 from the projected 2D image coordinate system (i.e. 2D pixel grid) (S420).

The hole area synthesis unit 140 calculates a 3D vertex coordinate value of the hole area by using the hole area calculated in step S420 (S430). Since the 3D vertex corresponding to the pixel position of the hole area (hole area corresponding to the 2D mask) calculated in step S420 is the vertex to be erased, the hole area synthesis unit 140 uses 3D vertex at a pixel position corresponding to an area other than the hole area. Hereinafter, this area is referred to as a 3D vertex other than the hole area. The hole area synthesis unit 140 calculates a 3D coordinate value (vertex coordinate value) of the hole area by interpolating by using coordinate values for 3D vertices other than the hole area. Here, for interpolation of 3D coordinate values, a Moving Least Squares method can be used. In the interpolation using the moving least squares method, structural information such as a vertex normal and color information of a texture image can be additionally used as additional information. In addition, the fact that the interpolated 3D coordinate value of the hole area is farther from the user than the vertex coordinate value of the selected hole area can be utilized.

Hereinafter, a method of interpolating a vertex coordinate value corresponding to a hole area using a Moving Least Squares method according to an embodiment will be described. Vertex coordinate values are calculated for the X-axis, Y-axis, and Z-axis, respectively, and are calculated as in Equation 1 below. As shown in Equation 1 below, Weight Least Squares are calculated by approximating p corresponding to the pixel grid by f, which is a second-order polynomial that determines the value of each vertex axis.

$$\underset{c(p)}{\mathrm{argmin}} \sum_{i \in \pi} w(p; p_i)(f(p_i) - f_i)^2 \qquad \text{(Equation 1)}$$

In Equation 1, w denotes a weight according to a distance in a pixel grid. And f, which is a second-order polynomial, can be defined as in Equation 2 below.

$$f(x,y) = c_0 + c_1 x + c_2 y + c_3 x^2 + c_4 + c_5 y^2 \qquad \text{(Equation 2)}$$

In Equation 2, x and y denote the position of a pixel.

Meanwhile, when additional information r is used for vertex interpolation, the second-order polynomial f may be changed as shown in Equation 3 below. Here, the additional information r may be structural information such as vertex normal described above and color information of a texture image.

$$f(x,y,r) = c_0 + c_1 x + c_2 y + c_3 r + c_4 x^2 + c_5 x y + c_6 y^2 + c_7 x r + c_8 y r + c_9 r^2 \qquad \text{(Equation 3)}$$

Figure 5:
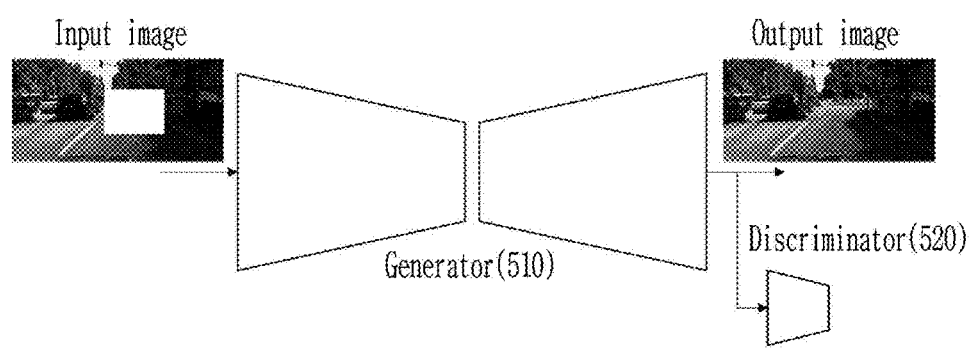
FIG. 5 shows an inpainting method for a 2D texture image, according to an embodiment.

FIG. 5 shows an inpainting method for a 2D texture image, according to an embodiment. That is, FIG. 5 shows a method of synthesizing the pixel values of the hole area by using the pixel values of the 2D texture image corresponding to the area other than the 2D mask by the hole area synthesis unit 140 according to an embodiment.

The hole area synthesis unit 140 according to an embodiment can perform inpainting on a 2D texture image using a deep learning network structure, as shown in FIG. 5. Here, the deep learning network structure includes a generator 510 and a discriminator 520. That is, the hole area synthesis unit 140 can include the generator 510 and the discriminator 520. A 2D texture image including the hole area is input to the generator 510, and the generator 510 outputs an image in which the hole area is synthesized (inpainted). Here, the discriminator 520 determines whether the generator 510 is synthesizing a plausible image, so that the generator 510 synthesizes a plausible image existing in the real world. Detailed operations of the generator 510 and the discriminator 520 can be understood by those of ordinary skill in the art to which the present invention pertains, and a detailed description thereof will be omitted.

Figure 6:
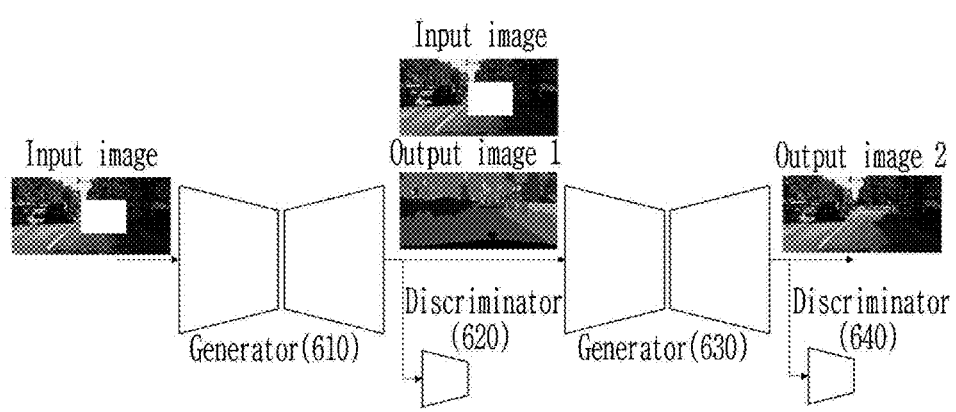
FIG. 6 shows an inpainting method for a 2D texture image, according to another embodiment.

FIG. 6 shows an inpainting method for a 2D texture image, according to another embodiment.

The hole area synthesis unit 140 according to an embodiment can perform inpainting on a 2D texture image using a deep learning network structure as shown in FIG. 6. Here, the deep learning network structure includes two generators 610 and 630 and two discriminators 620 and 640. That is, the hole area synthesis unit 140 can include two generators 610 and 630 and two discriminators 620 and 640. A 2D texture image including the hole area is input to the generator 610, and the generator 610 outputs a semantic region division image (output image 1). Here, the generator 610 synthesizes the hole area by using the semantic region information for the hole area as well as the area other than the hole as additional information. For example, when a part of a road is included in the hole area, the generator 610 outputs the output image 1 obtained by inferring that the road information is included in the hole as semantic area division information. The 2D texture image including a hole area (same as a 2D texture image input to the generator 610) and the output image 1 are input to the generator 630. The generator 630 outputs an output image 2 in which the hole area is synthesized (inpainted) using two images (the 2D texture image including the hole area and the output image 1). The discriminator 620 and the discriminator 640 allow the generator 610 and the generator 630 to synthesize plausible results that exist in the real world, respectively.

Figure 7:
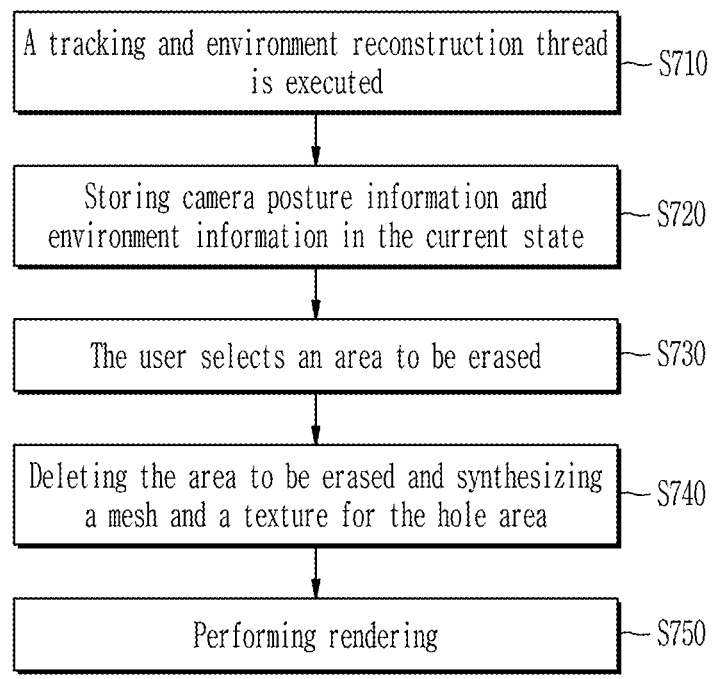
FIG. 7 is a flowchart showing an operation of augmented reality content to which the real object erasing method is applied, according to an embodiment.

FIG. 7 is a flowchart showing an operation of augmented reality content to which the real object erasing method, according to an embodiment is applied.

When the content starts, a tracking and environment reconstruction thread is executed for 3D augmented reality (S710). This step S710 can be performed by the environment reconstruction thread unit 110.

The user can then perform the next action in a natural state, such as stopping or moving at the location where the content started.

When the user clicks an erase button, the real object erasing apparatus 100 stops the current screen and stores camera posture information and environment information (mesh and texture) in the current state (S720).

When the user selects an area to be erased, the real object erasing apparatus 100 deletes the area to be erased (to create a hole), and synthesizes a mesh and a texture for the hole area (S730, S740). The step S730 can be performed by the erase area selection unit 120 120, and the step S740 may be performed by the hole area mask generation unit 130 and the hole area synthesis unit 140.

The real object erasing apparatus 100 performs rendering by using the mesh and the texture for the hole area (S750). This step S750 can be performed by the synthesis area rendering unit 150. Such a rendered result can achieve the effect of erasing the real object.

Figure 8:
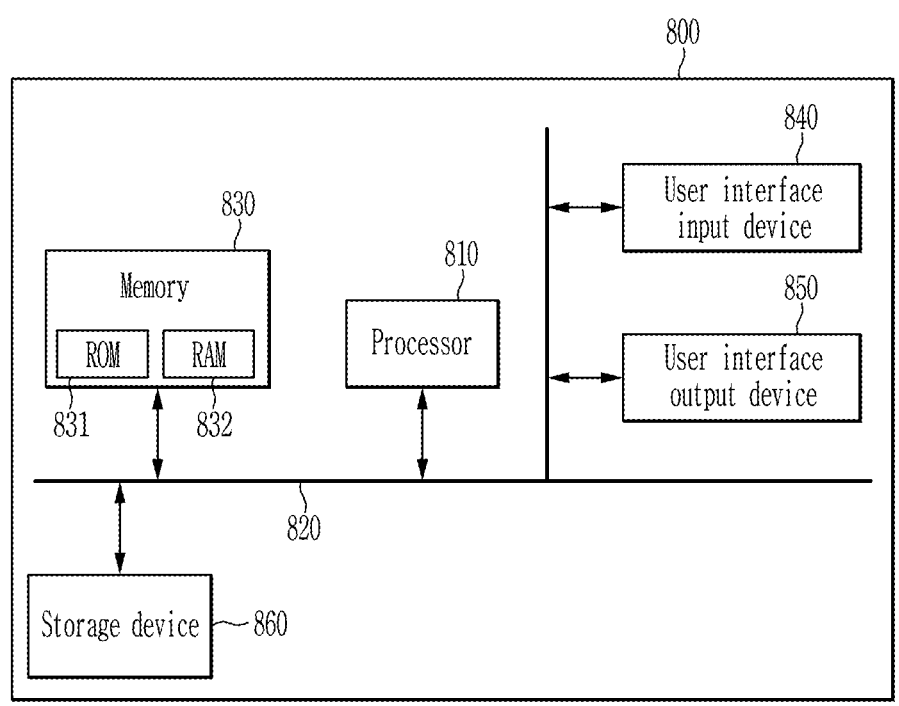
FIG. 8 is a diagram showing a computer system, according to an embodiment.

FIG. 8 is a diagram showing a computer system 800, according to an embodiment.

The real object erasing apparatus 100 according to an embodiment can be implemented in the computer system 800 of FIG. 8. Each component of real object erasing apparatus 100 can also be implemented in the computer system 800 of FIG. 8.

The computer system 800 can include at least one of a processor 810, a memory 830, a user interface input device 840, a user interface output device 850, and a storage device 860, that communicate via a bus 820.

The processor 810 can be a central processing (CPU) or a semiconductor device that executes instructions stored in the memory 830 or the storage device 860. The processor 810 can be configured to implement the functions and methods described in FIG. 1 to FIG. 7.

The memory 830 and the storage device 860 can include various forms of volatile or non-volatile storage media. For example, the memory 830 can include a read only memory (ROM) 831 or a random access memory (RAM) 832. In an embodiment, the memory 830 may be located inside or outside the processor 810, and the memory 830 can be coupled to the processor 810 through various already-known means.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for erasing a real object by an apparatus for erasing the real object in 3D augmented reality, the method comprising:
   receiving an erasing area in the 3D augmented reality from a user;
   generating a 2D mask and a 3D mask corresponding to the erasing area;
   generating a hole in the 3D augmented reality by using the 2D mask and the 3D mask; and
   performing inpainting on a hole area corresponding to the hole,
   wherein the performing includes synthesizing a first texture image for the hole area by using a second texture image corresponding to an area excluding the 2D mask and calculating a first vertex value for the hole area by using a second vertex value corresponding to an area excluding the 3D mask.

2. The method of claim 1, further comprising
   performing rendering by using the first texture image and the first vertex value.

3. The method of claim 1, wherein
   the first texture image and the second texture image are 2D texture images.

4. The method of claim 3, wherein
   the first vertex value and the second vertex value are vertex coordinate values.

5. The method of claim 1, wherein
   the synthesizing includes synthesizing the first texture image by applying a deep learning network to the second texture image.

6. The method of claim 1, wherein
   the calculating includes calculating the first vertex value by interpolating using the second vertex value.

7. The method of claim 6, wherein
   the interpolating applies a moving least squares method.

8. The method of claim 1, further comprising
adding a virtual object to the 3D augmented reality including the inpainted hole area.

9. The method of claim 1, wherein
the 3D augmented reality is an image in which a real environment is reconstructed to 3D.

10. An apparatus for erasing a real object in 3D augmented reality, the apparatus comprising:
an environment reconstruction thread unit configured to perform 3D reconstruction of a real environment for the 3D augmented reality;
an erase area selection unit configured to receive an erasing area in the 3D reconstruction image from a user;
a hole area mask generation unit configured to generate a 2D mask and a 3D mask corresponding to the erasing area and to generate a hole in the 3D reconstruction image by using the 2D mask and the 3D mask; and
a hole area synthesis unit configured to perform synthesis for an hole area corresponding to the hole by using a first texture image corresponding to an area excluding the 2D mask and a first vertex value corresponding to an area excluding the 3D mask.

11. The apparatus of claim 10, wherein
the hole area synthesis unit synthesizes a second texture image for the hole area by using the first texture image, calculates a second vertex value for the hole area by using the first vertex value, and performs the synthesis by using the second texture image and the second vertex value.

12. The apparatus of claim 11, further comprising
a synthesis area rendering unit configured to perform rendering by using the second texture image and the second vertex value.

13. The apparatus of claim 11, wherein
the hole area synthesis unit includes:
a generator configured to receive the first texture image and to output the second texture image; and
a discriminator configured to determine an output of the generator.

14. The apparatus of claim 11, wherein
the hole area synthesis unit includes:
a first generator configured to receive the first texture image;
a first discriminator configured to determine an output of the first generator;
a second generator configured to receive an output of the first generator and the first texture image and to output the second texture image; and
a second discriminator configured to determine an output of the second generator.

15. The apparatus of claim 11, wherein
the hole area synthesis unit calculates the second vertex value by applying a moving least squares method using the first vertex value.

16. The apparatus of claim 12, further comprising
a virtual object adding unit configured to add a virtual object to an output image of the synthesis area rendering unit.

* * * * *